US008819564B1

(12) United States Patent
Heath et al.

(10) Patent No.: US 8,819,564 B1
(45) Date of Patent: Aug. 26, 2014

(54) DISTRIBUTED DISCUSSION COLLABORATION

(75) Inventors: Taliver Heath, Mountain View, CA (US); John Mishanski, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 483 days.

(21) Appl. No.: 12/035,903

(22) Filed: Feb. 22, 2008

(51) Int. Cl.
*G06F 3/00* (2006.01)
*G06F 11/00* (2006.01)
*G06F 3/048* (2013.01)
*G06Q 10/10* (2012.01)

(52) U.S. Cl.
CPC .......... *G06F 3/048* (2013.01); *G06T 2219/024* (2013.01); *G06Q 10/103* (2013.01)
USPC ............. 715/751; 715/733; 715/202; 725/24; 705/12; 235/386

(58) Field of Classification Search
CPC ...... G07C 13/00; G07C 13/02; G06Q 10/101; G06Q 10/103; H04N 21/4758; H04W 74/06; H04L 51/04; H04L 65/403; H04L 67/38; H04M 7/0027; G06F 3/048; G06F 9/4451; G06T 2219/024
USPC ............. 715/751, 202, 733; 705/12; 235/386; 725/24
See application file for complete search history.

(56) References Cited

U.S. PATENT DOCUMENTS

| | | | | |
|---|---|---|---|---|
| 6,952,678 | B2 * | 10/2005 | Williams et al. | 705/320 |
| 7,620,636 | B2 * | 11/2009 | Fasciano | 1/1 |
| 7,958,010 | B2 * | 6/2011 | Huang | 705/26.7 |
| 8,321,361 | B1 * | 11/2012 | Heath et al. | 706/45 |
| 8,434,010 | B2 * | 4/2013 | Dawson et al. | 715/758 |
| 8,527,366 | B2 * | 9/2013 | Sushil et al. | 705/26.5 |
| 8,539,359 | B2 * | 9/2013 | Rapaport et al. | 715/751 |
| 8,548,996 | B2 * | 10/2013 | Tareen et al. | 707/732 |
| 8,560,385 | B2 * | 10/2013 | Atazky et al. | 705/14.19 |
| 2001/0044729 | A1 * | 11/2001 | Pomerance | 705/1 |
| 2002/0111817 | A1 * | 8/2002 | Cronin | 705/1 |
| 2003/0093790 | A1 * | 5/2003 | Logan et al. | 725/38 |
| 2003/0233274 | A1 * | 12/2003 | Urken et al. | 705/12 |
| 2004/0123234 | A1 * | 6/2004 | Anderson et al. | 715/513 |
| 2005/0228983 | A1 * | 10/2005 | Starbuck et al. | 713/151 |

(Continued)

OTHER PUBLICATIONS

Matthias Nickles, "Towards a Multiagent System for Competitive Website Ratings," Research Report FKI-243-01, Technical University Munich, 2001, pp. 1-27.

(Continued)

*Primary Examiner* — Ece Hur
(74) *Attorney, Agent, or Firm* — Patent Law Works LLP (57) ABSTRACT

The present invention relates to systems and methods for distributed discussion collaboration and making an agenda for an event over a network. In an embodiment, a system may include an aggregator configured to aggregate discussion items submitted by collaborators, and a view controller associated with the collaborators and configured to provide for display the aggregated items. A system may also include a voting module configured to receiving voting information submitted by the collaborators for the discussion items, and an ordering module configured to analyze the voting information and order the aggregated items based on the analyzed voting information. In another embodiment, a method includes aggregating discussion items submitted by collaborators and receiving voting information for the aggregated items. The method further includes ordering the aggregated items based upon an analysis of the voting information, and providing for display on a user interface the aggregated items with respective voting information.

31 Claims, 5 Drawing Sheets

(56) References Cited

U.S. PATENT DOCUMENTS

| | | | | |
|---|---|---|---|---|
| 2008/0087729 | A1* | 4/2008 | Yee et al. | 235/386 |
| 2008/0103880 | A1* | 5/2008 | Saaty | 705/12 |
| 2008/0140666 | A1* | 6/2008 | D'Alton Harrison | 707/9 |
| 2009/0037414 | A1* | 2/2009 | Olivier et al. | 707/7 |
| 2009/0070128 | A1* | 3/2009 | McCauley et al. | 705/1 |
| 2009/0070426 | A1* | 3/2009 | McCauley et al. | 709/205 |
| 2009/0240516 | A1* | 9/2009 | Palestrant | 705/1 |
| 2010/0312537 | A1* | 12/2010 | Rayan et al. | 703/11 |
| 2010/0325125 | A1* | 12/2010 | Bomfim et al. | 707/759 |
| 2013/0317891 | A1* | 11/2013 | Grigorash et al. | 705/12 |

OTHER PUBLICATIONS

Jorg M. Haake et al., "Supporting Flexible Collaborative Distance Learning in the CURE Platform," Proceedings of the 37$^{th}$ Hawaii International Conference on System Sciences, 2004, Hagen, Germany.

Gustavo Zurita et al., "Using PDAs in Meetings: Patterns, Architecture and Components," Journal of Universal Computer Science, vol. 14, No. 1, Jan. 1, 2008, pp. 123-147.

Digg/Frequently Asked Questions (FAQ), http://web.archive.org/web/20070814042808/http://digg.com/faq, May 22, 2008, pp. 1-3 (archive date: Aug. 14, 2007).

Digg/News, http://web.archive.org/wweb/20070814021234/http://digg.com/, May 22, 2008, pp. 1-8 (archive date: Aug. 14, 2007).

Digg/How Digg Works, http://web.archive.org/web/20070814042631/http://digg.com/how, May 22, 2008, pp. 1-2 (archive date: Aug. 14, 2007).

Drew Harry et al., "backchan.nl—Integrating Backchannels With Physical Space," CHI 2008, Apr. 5-10, 2008, Florence, Italy, 6 pages.

* cited by examiner

DISTRIBUTED DISCUSSION COLLABORATION

BACKGROUND

1. Field of the Invention

The present invention relates to network communications and interactive multimedia.

2. Background Art

Speakers often invite questions from an audience. Some presentations have a question and answer period after a presentation. Other speakers take questions during the event. It is often the case that a question arises during a presentation that will be answered by a later segment of the presentation. However, the speaker often stops and restarts the talk to answer the question. In addition, some questions might benefit the majority of the participants while other questions may only have the effect of needlessly sidetracking a speaker. Because the speaker and participants may be sensitive to these issues, some good questions may never get asked or answered.

Some presentation formats presently exist to allow questions to be submitted in text by participants in a presentation or event. Such formats are provided for distance learning, online presentations and teleconferences. However, the questions of other participants are usually never seen by all of the participants. The questions that do get answered are usually picked in some ad hoc fashion by a moderator. Audience members may not have a chance to decide or influence which questions they want to have answered.

Participants often like to respond to and influence discussion topics. Chat rooms and blogs provide some avenues of expression related to presented topics, but these are often time-insensitive, distributed efforts that are not moderated. Such asynchronous formats are not intended for focused live talks or presentations with attentive participants.

In a non-presentation context, topics may be influenced through user-based ranking systems. Users and community participants can presently select media articles and then take action to promote media articles to the top of a popularity list. Comments on these articles can be collected and likewise promoted up or down. However, these article ranking systems do not center around an ongoing or future live talk or presentation. In addition, discussion items are not provided and voted on in real-time by invited collaborators. These ranking systems are often ineffective due to less than serious participation and too much user control. Other online collaborative systems suffer from a lack of simplicity and flexibility. Such systems are poor formats for efficient and effective interaction between a live presenter and serious audience participants.

In addition, many events include an agenda or list of topics to cover during the event. However, this agenda is often based upon a less than fully informed assessment of what topics are most important to attendants. Often this wastes time, money and patience. It is true that certain events are better served by direction from a single individual or group of individuals. However, some events and meetings welcome serious (or less than serious) input from participants and are better served by such participation. Also, an increasing number of events involve numerous individuals spread out among different locations. Frequently, a determination of which agenda topics are most important to participants is usually made during or after the meeting. Further, such input is often not representative of the participant group as a whole and is often not channeled simply and effectively.

BRIEF SUMMARY OF THE INVENTION

The present invention relates to systems and methods for distributed discussion collaboration. The present invention also relates to systems and methods for making an agenda for an event over a network. In an embodiment, a system for distributed discussion collaboration is provided. The system includes an aggregator configured to aggregate discussion items submitted by collaborators during an event. The system also includes a view controller associated with the collaborators and configured to provide for display the aggregated items. The system further includes a voting module configured to receive voting information submitted by the collaborators for the discussion items. The system also includes an ordering module configured to analyze the voting information and order the aggregated items based on the analyzed voting information.

In another embodiment, a method for distributed discussion collaboration is provided. The computer-implemented method includes aggregating discussion items submitted by collaborators during an event. The method also includes receiving voting information submitted by the collaborators for the aggregated items and ordering the aggregated items based upon an analysis of the voting information. The method further includes providing for display on a user interface the aggregated items with respective voting information during an event.

In a further embodiment, a system for making an agenda for an event over a network is provided. The system includes an aggregator configured to aggregate discussion items submitted by collaborators prior to the event. The system also includes a voting module configured to receive voting information submitted by the collaborators for the discussion items. The system further includes an ordering module configured to analyze the voting information and order the aggregated items based on the analyzed voting information. The system also includes a view controller associated with the collaborators and configured to provide for display the aggregated items, whereby the agenda for the event may be created based upon the aggregated items.

In another embodiment, a method for making an agenda for an event over a network is provided. The computer-implemented method includes aggregating discussion items submitted by collaborators prior to an event. The method also includes receiving votes submitted by the collaborators for the aggregated items and ordering the aggregated items based upon an analysis of voting information. The method further includes providing for display on a user interface the aggregated items with respective voting information prior to the event. The method also includes making the agenda for the event based upon the aggregated items.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to systems and methods for distributed discussion collaboration. Embodiments described herein also refer to systems and methods for making an agenda for an event over a network. An event involves multiple participants that can be in the same physical vicinity of the speaker or presenter or in different locations but participating in the same event. An event may include a talk, presentation, meeting, speech, debate, roundtable, panel, or any other format where participants are focused on a person or group of persons that are a focal point(s) of presentation or discussion. Collaborators may be participants, audience members, employees, students, attendees or any other group of people focused on a person or group of persons that are a focal point(s) of presentation or discussion. Collaborators are likely invited to the event or otherwise allowed to participate. According to many embodiments, the methods and systems referred to herein are meant to augment, not replace, live participants and questioners.

Figure 1:
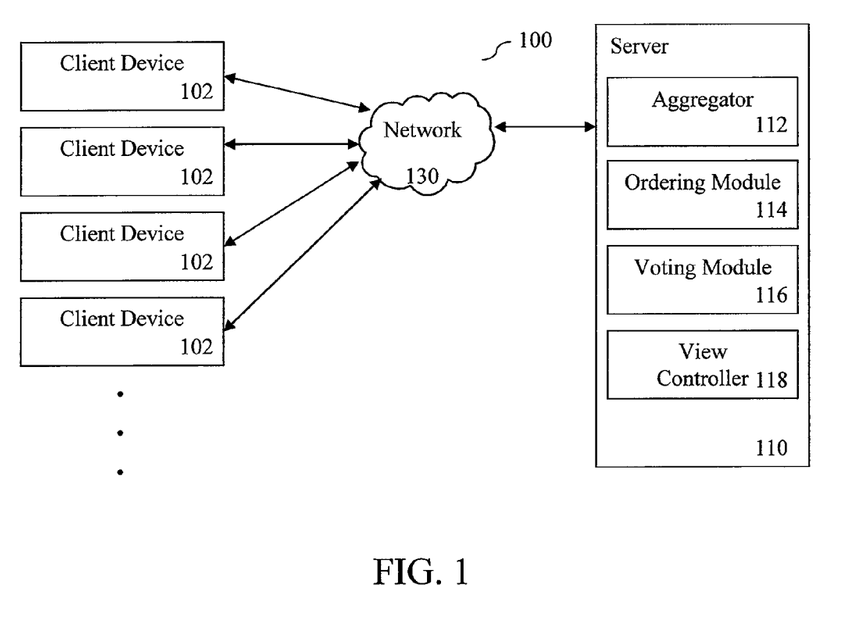
FIG. 1 illustrates a system for distributed discussion collaboration, according to an embodiment of the present invention.

FIG. 1 illustrates an exemplary system 100 for distributed discussion collaboration, according to an embodiment of the present invention. According to another embodiment, exemplary system 100 may also be used for making an agenda for an event over a network. System 100 shows client device 102. Client device 102 may be a processing device (e.g., computer, mobile device, laptop, cell phone, smart phone, or media player). System 100 also shows server 110, which may be a processing device (e.g., computer, mobile device, laptop, cell phone, smart phone, or media player) operating in a server capacity. Server 110 and client devices 102 are coupled over network 130.

In an embodiment, server 110 may include aggregator 112, ordering module 114, voting module 116 and view controller 118. Aggregator 112 aggregates discussion items submitted by collaborators and received by server 110. Discussion items may include questions, topics, or other points of presentation or discussion. Collaborators may submit new discussion items digitally, textually, visibly or audibly through client device 102. In other cases, collaborators may submit new discussion items by another physical manifestation, recorded manually or automatically by system 100. Existing discussion items may also be changed or edited. Client device 102 may use a form, webpage, microphone or any other means for obtaining discussion items and transmitting them to server 110. According to embodiments for distributed discussion collaboration, aggregator 112 receives these discussion items during an event. According to embodiments for making an agenda for an event over a network, aggregator 112 receives these discussion items prior to an event. In another embodiment, aggregator 112 may create or update a user profile for the collaborator and associate the discussion item with the collaborator. In a further embodiment, aggregator 112 may be configured to receive discussion items anonymously. Discussion items may be aggregated or voted on before an event.

Discussion items may also include additional discussion item information. Such information may include identification of the collaborator contributing the discussion item, title of the contributor, a time and/or date of the discussion item, affiliation information, team information, categorization information, or any other information that may be pertinent to improving the effectiveness of an event or agenda. In an embodiment, any combination of discussion item information may be present. In another embodiment, some or all of this item information may be removed or marked as anonymous.

The discussion items aggregated by aggregator 112 may be sorted or arranged based upon information from ordering module 114. In an embodiment, aggregated items may be ordered based upon an analysis of voting information received from voting module 116. Voting information analysis may be performed by ordering module 114. In another embodiment, some analysis of the voting information may also be performed by voting module 116. Ordering may involve determining an order or placement of the discussion items in relation to each other. In an embodiment, ordering may include placing or promoting more popular discussion items on an aggregated list. Ordering may include removing or demoting less popular discussion items. In another embodiment, ordering may include promoting or demoting discussion items on an aggregated list based upon determined scores for the discussion items. In a further embodiment, ordering may include prioritizing. In another embodiment, ordering may include ranking. In yet another embodiment, ordering may involve including only discussion items that reach a certain threshold. As would be appreciated by those skilled in the art(s), ordering may be determined in any number of ways. Ordering may be determined prior to or during an event. A user, speaker, moderator or any other person given such a responsibility may configure ordering module 114 prior to or during an event.

Collaborators are provided the opportunity to view and vote on discussion items for an event. Voting module 116 is responsible for the administration and collection of voting information for aggregated items submitted by collaborators. In an embodiment, collaborators may be provided voting instructions or voting help through client device 102. Voting information may be collected from collaborators performing an action using client device 102. In another embodiment, voting may be performed by a physical manifestation. In such a case the voting information may be collected and provided to voting module 116 manually or by some automatic process of system 100. In a further embodiment, a polling mechanism may be employed.

Voting information may be collected according to a voting configuration. The voting configuration may easily be created, updated or replaced. In some cases, pluggable voting logics may be used. In an embodiment, voting information may be collected by counting votes. In another embodiment, voting information may include additional information such as timestamps (using a timestamper), response times, who voted, who did not vote, or other participation information that may assist in the analysis of voting information. A voting configuration may be constructed based on these various types of information. A voting configuration may also include the method of counting votes based upon who is submitting votes. In a further embodiment, a voting configuration may consider the user profiles or affiliations of collaborators. The voting configuration may also consider whether the collaborator is internal or external to a group or organization. The voting configuration may be used in the analysis of voting information. According to another embodiment, a voting configuration may include collecting separate voting information on whether or not a discussion item has been answered or sufficiently addressed.

Voting information may be collected and analyzed in various ways. For example, votes may be counted on a one vote per collaborator basis. In another example, votes cast by certain collaborators may be given greater weight. In a further example, positive votes may be given greater weight than negative votes as to allow somewhat controversial discussion items to receive a greater chance of being addressed. For instance, a positive vote could carry twice as much weight as a negative vote. In another case, the most controversial discussion items may be sought out. Additional examples of voting may include multiple voting, ranked voting, scored voting, or any other form of voting customized to the event.

Aggregated items, ordering information and voting information may be communicated to view controller 118. View controller 118 is configured to display aggregated items on a user interface or other type of display. In an embodiment, the display may be on client device 102. In another embodiment, the display may be on a large viewing means or through any other means visible to many participants. In another embodiment, view controller 118 may be configured to display the aggregated items with their respective voting information. In a further embodiment, respective voting information may include a voting score. It may also include a voting amount indicator, which determines how many votes have been cast. The voting amount may be by shown by number of votes cast. It may also be shown by a percentage of votes cast out of the total potential votes that may be cast. The voting information may be shown through text, numbers, graphics, audio, animation, video or any other form of multimedia. In an embodiment, the voting information may be shown in real-time. In another embodiment, voting information may be periodically updated. In a further embodiment, view controller 118 customizes the view for each collaborator based upon an affiliation of the collaborator or upon submissions by the collaborator. In another embodiment, certain discussion items, item information, or voting information may or may not be available to some collaborators while it is available to other collaborators.

View controller 118 may be configured to provide for display the aggregated items through a web browser or through any other customized application or display. In an embodiment, the display will include a form or place where discussion items may be entered in order to be subsequently transmitted and received by server 110. In another embodiment, view controller 118 controls the display on client device 102. In a further embodiment, view controller 118 exists on server 110. In another embodiment, view controller 118 exists on client device 102. In yet another embodiment, it is desirable that view controller 118 be configured to display the aggregated items and voting information in a clean and simple manner. In some cases, collaborators may be allowed to personally customize some aspects of the display. In another embodiment, view controller 118 may function during periods of time when client device 102 is not connected to server 110.

Discussion items aggregated prior to an event may be used to make an agenda for an event. According to an embodiment, an agenda for an event can be created and/or displayed using view controller 118. Client device 102 may also be used to create and/or display an agenda for an event. In some cases, server 110 or a component connected to or in communication with server 110 may be used to create and/or display an agenda for an event. According to another embodiment, an agenda for the event could be created in another form. Such a form may include a physical or electronic document. Other forms may include using audio, video or other multimedia to represent an agenda for the event. According to a further embodiment, agendas may also be customized based upon the identity of a collaborator.

Figure 2:
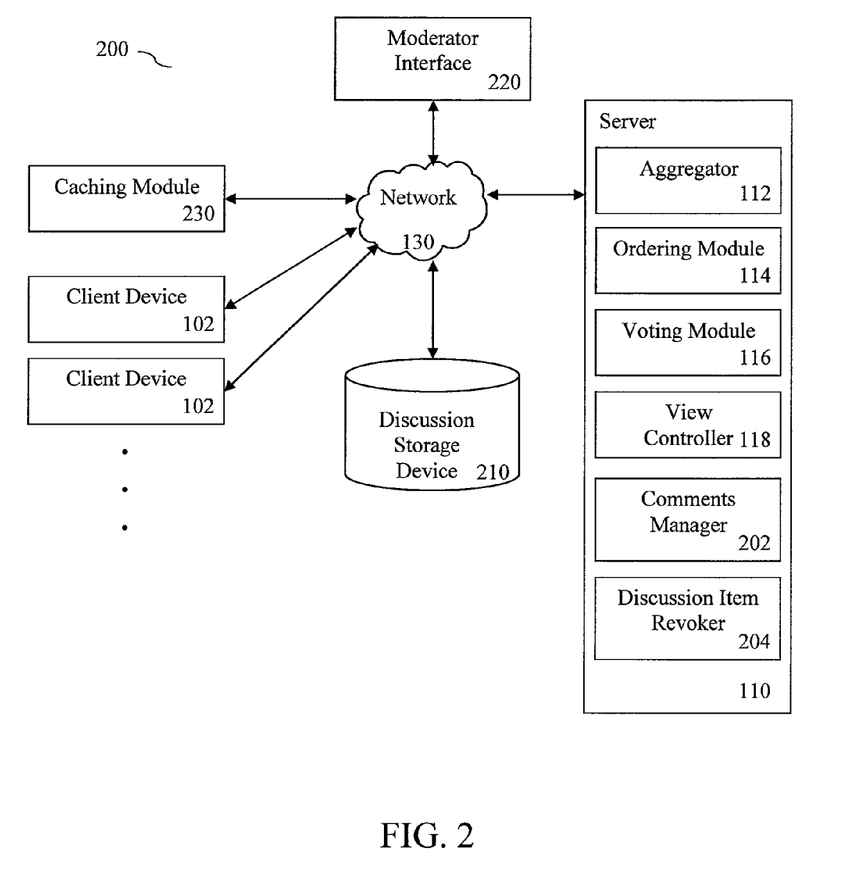
FIG. 2 illustrates a system for distributed discussion collaboration, according to an embodiment of the present invention.

FIG. 2 illustrates an exemplary system 200 for distributed discussion collaboration, according to an embodiment of the present invention. According to another embodiment, exemplary system 200 may also be used for making an agenda for an event over a network. System 200 shows client device 102, server 110 and discussion storage device 210 coupled over network 130. Discussion storage device 210 may be a database or any other data storage medium. Discussion storage device 210 may be configured to store discussion items, discussion item information, collaborator profiles, voting information, comments, or any other related data. According to an embodiment, discussion storage device 210 may be a separate storage medium coupled to server 110 over network 130. According to another embodiment, discussion storage device 210 may exist on server 110.

In an embodiment, discussion items may be merged or combined with aggregated items of another data source or event. The additional aggregated items may include those of another ongoing event or a past event. Aggregated items may also be arranged to overlap or accumulate with other aggregated items. In some cases, an agenda or event may carry over aggregated items from a past or different event. This may be performed with the assistance of discussion storage device 210. In addition, a new agenda may be displayed and/or created based upon the combined or merged aggregated items. In other cases, all information for an event is deleted or unavailable for further analysis or review.

In a further embodiment, voting information may be merged or combined with voting information of another data source or event. The additional voting information may include that of another ongoing event or a past event. Voting information may also be arranged to overlap or accumulate with other voting information. In some cases, an agenda or event may carry over voting information from a past event. This may be performed with the assistance of discussion storage device 210. In other cases, all information for an event is deleted or unavailable for further analysis or review.

In another embodiment, user profile or collaborator information may be merged or combined with collaborator profile information of another data source or event. The additional collaborator profile information may include that of another ongoing event or a past event. Collaborator profile information may also be arranged to overlap or accumulate with other collaborator profile information. In some cases, an agenda or event may carry over collaborator profile information from a past event. This may be performed with the assistance of discussion storage device 210. In other cases, all information for an event is deleted or unavailable for further analysis or review.

System 200 also shows aggregator 112, ordering module 114, voting module 116 and view controller 118. In an embodiment, server 110 may include comments manager 202. Comments manager 202 may be used to assist fellow collaborators in influencing the direction of an event, an agenda, or voting. Comments manager 202 receives comments related to specific discussion items. In an embodiment, these comments may be received by client device 102, configured to obtain and transmit comments. In another embodiment, comments may also be received by a physical manifestation, recorded manually or automatically by system 200. Identifying information may be included with the comments. In another embodiment, comments can be submitted anonymously. In a further embodiment, a moderator or other event participant may moderate or handle the comments. In yet another embodiment, comments manager 202 may communicate with aggregator 112 or view controller 118.

Server 110 may include discussion item revoker 204, according to an embodiment. Discussion item revoker 204 receives requests from collaborators that a discussion item submitted by a collaborator either be edited, replaced, or revoked. These actions may also pertain to discussion item information. This request may be the result of voting. This request may be the result of receiving an answer or response to the discussion item from proceedings of the event, additional information about the event, information about other discussion items, comments from other collaborators, or side-channel information. Comments may be public or private. In an embodiment, the revocation may take place prior to an event. In another embodiment, the revocation may take place during the event. In a further embodiment, collaborators may not be allowed to revoke or restore a discussion item during certain periods of time.

Discussion item revoker 204 may verify the identity of a collaborator, according to an embodiment. In some cases, only the collaborator that submitted the discussion item may revoke, edit or replace the discussion item. Login, passwords, encryption, identification methods and/or security means may be used. In an embodiment, the speaker, moderator, or other certain collaborators may revoke, edit or replace a discussion item.

According to another embodiment, system 200 may include moderator interface 220. Moderator interface 220 is a user interface that enables a moderator or someone of a similar responsibility to manage the aggregator 112, the ordering module 114, the voting module 116 and/or the view controller 118. Moderators or responsible collaborators may interact with moderator interface 220 through textual, graphical, audile, or other interactive means. Moderator interface 220 may be used to configure the operation of the components of system 200. In an embodiment, moderator interface 220 may be used to configure the operation of any combination of the modules of server 110. Moderator interface 220 may also be used to monitor and/or moderate collaborator participation, discussion items, comments, voting and/or any other related information or processes. Moderator interface 220 may be coupled to server 110 directly or over network 130.

According to a further embodiment, system 200 may include caching module 230. Caching module 230 may be configured to cache aggregated items, collaborator profiles, discussion item information, comments, or voting information. In an embodiment, caching module 230 may be coupled to server 110 directly or over network 130. In another embodiment, caching module 230 may exist on server 110. In a further embodiment, caching module 230 may exist on client device 102.

Caching module 230 may be configured to synchronize information between client device 102 and server 110. In another embodiment, view controller 108 may be configured to synchronize information between client device 102 and server 110. In a further embodiment, system 200 may be configured to synchronize information between the modules within server 110. In another embodiment, system 200 may be configured to synchronize information between discussion storage device 210, server 110, and/or client device 102.

Figure 3:
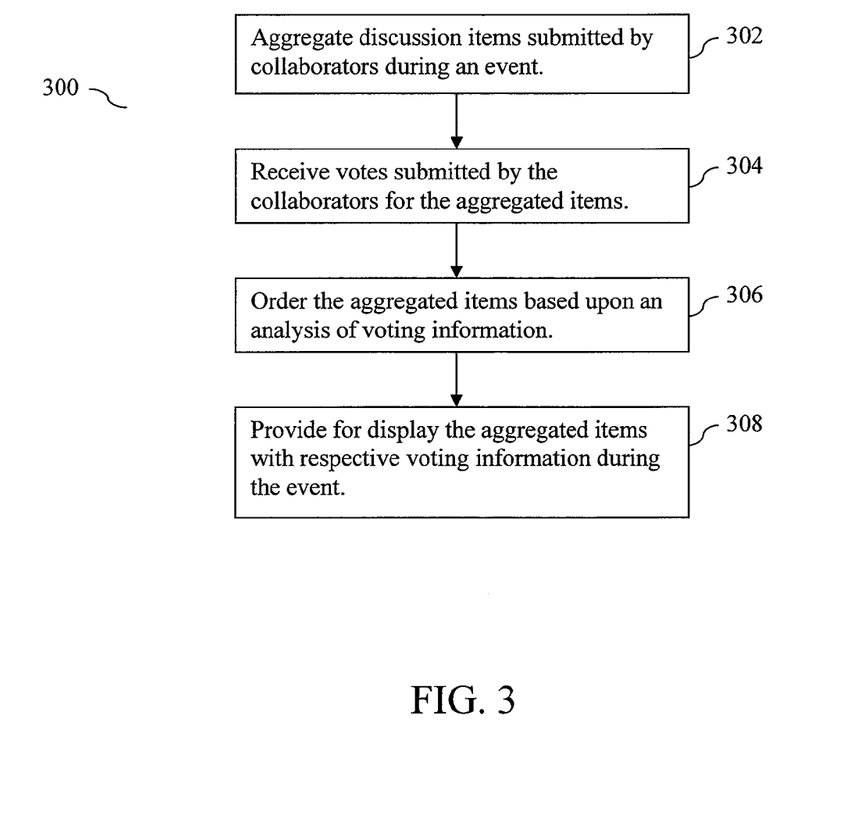
FIG. 3 shows a flowchart illustrating a method for distributed discussion collaboration, according to an embodiment of the present invention.

FIG. 3 illustrates an exemplary method 300 for distributed discussion collaboration, according to an embodiment of the present invention (steps 302-308). Aggregator 112 receives and aggregates discussion items received by collaborators during an event in step 302. In step 304, voting information submitted by the collaborators for the aggregated items is received. In an embodiment, voting information may include votes. This step may be performed with the assistance of voting module 116. The aggregated items are ordered based upon an analysis of voting information in step 306. This step may be performed with the assistance of ordering module 114. In step 308, the aggregated items are provided for display with respective voting information during the event, as in embodiments described above. This step is assisted by view controller 118. Items may be displayed on a user interface.

According to an embodiment, a speaker or presenter may review discussion items, voting information, comments and/or collaborator information in order to analyze a talk, presentation or event. Such an analysis could provide information for improving the effectiveness of a future event or content related to an event. In some cases, a speaker or presenter may use this information to communicate with collaborators based upon collaborator submissions. Likewise, collaborators may use this information for communication with other collaborators. According to another embodiment, discussion items, comments, voting information and/or other information may be timestamped for synchronization with a transcript, audio recording, video recording, or other media representation of the event to assist in an analysis of an event or content of an event.

Figure 4:
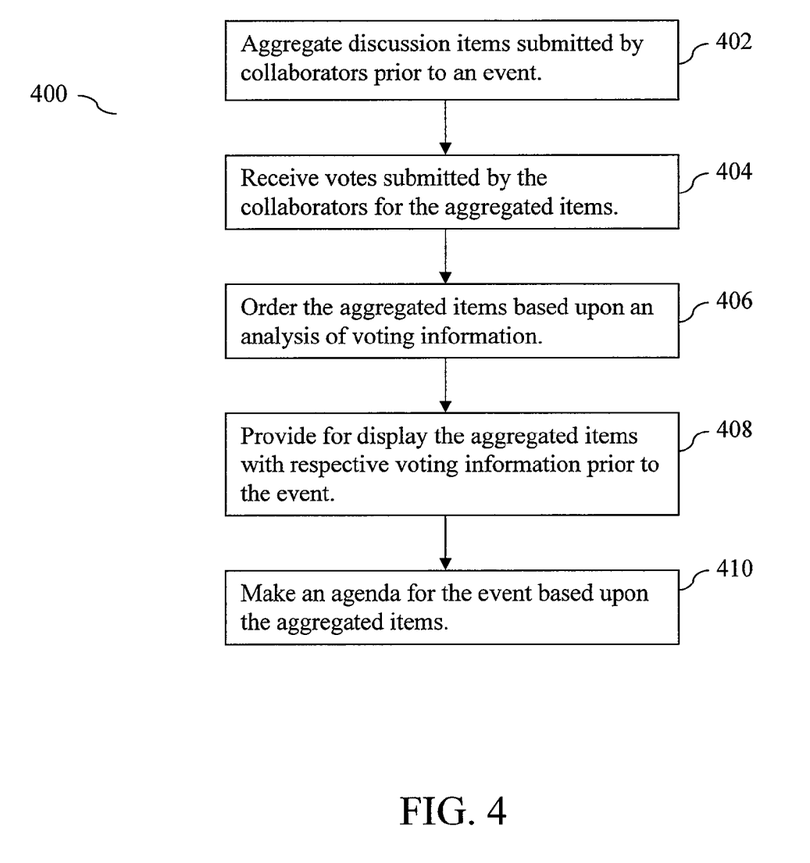
FIG. 4 shows a flowchart illustrating a method for making an agenda for an event over a network, according to an embodiment of the present invention.

FIG. 4 illustrates an exemplary method 400 for making an agenda for an event over a network, according to an embodiment of the present invention (steps 402-410). Aggregator 112 receives and aggregates discussion items received by collaborators prior to an event in step 402. In step 404, voting information submitted by the collaborators for the aggregated items is received. This may be performed with the assistance of voting module 116. The aggregated items are ordered based upon an analysis of voting information in step 406. This step may be performed with the assistance of ordering module 114. In step 408, the aggregated items are provided for display with respective voting information prior to the event, as in embodiments described above. This step is assisted by view controller 118. In step 410, an agenda for the event is made based upon the aggregated items. An agenda can be created from the ordered aggregated items and voting information. The final agenda may be produced or duplicated in any form, as described further above.

Aspects of the present invention, for example, system 100, system 200, method 300 and/or method 400 or any part(s) or function(s) thereof may be implemented using hardware, software, computer program instructions recorded on a tangible medium to be executed by a processor, firmware, or a combination thereof and may be implemented in one or more computer systems or other processing systems.

Figure 5:
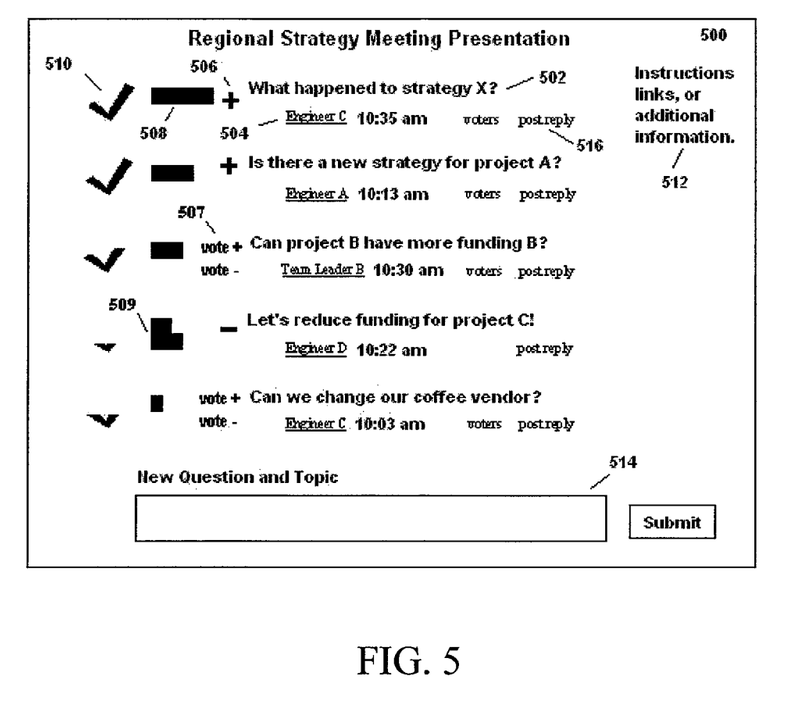
FIG. 5 illustrates a user view, according to an embodiment of the present invention.

FIG. 5 illustrates a user interface view or display 500 relating to a system or method for distributed discussion collaboration, according to an embodiment. Display 500 and its parts are for purposes of illustration and are not limited to the embodiment shown in FIG. 5. Display 500 shows discussion item 502 and discussion item information 504. Display 500 shows other discussion items as well. Display 500 also shows a positive vote 506 already cast by the collaborator. Vote 506 may also be shown as a negative vote. As would be appreciated by those skilled in the art(s), votes may be cast with user interface display 500 in any fashion. For example, votes may be cast by pressing or clicking on a representation of a positive or negative vote 507. A representation of a positive or negative vote 507 may be shown in various ways and is not limited to the example shown in this embodiment. In another example, votes may be cast by pressing or clicking on an aggregated item and voting in response to a voting prompt. Display 500 also shows a voting score 508, according to an embodiment. Voting score 508 can be represented numerically, graphically or in any other manner which communicates voting results. For example, voting score 508 in display 500 is represented by a graphical bar. The length of the bar compared to shorter lengths illustrates a larger voting score. According to another embodiment, voting score 508 can show both a positive score and a negative score. For instance, voting scores may be represented by both a bar for a positive score and a second bar for a negative score 509.

Display 500 also shows voting amount indicator 510, which illustrates the amount of voting that has taken place for this discussion item 502, according to an embodiment. For instance, a larger fill area in a check mark indicates more votes have been made while a smaller fill area indicates less votes have been made. Voting amount indicator 510 can be represented numerically, graphically or in any other manner which communicates the amount of voting that has taken place for the discussion item 502.

The embodiment shown in display 500 may also have other features. Additional instructions, links, or information 512 may be found on the display. Display 500 may also include a place to enter new discussion items 514. Also, there may be links 516 to information about the voters, comments on the discussion items, or a form to post a reply or comments. Display 500 is not limited to the embodiment shown in FIG. 5.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for distributed discussion collaboration over a network,
comprising:
a computing device;
an aggregator, implemented on the computing device, and configured to aggregate a plurality of discussion items submitted by one or more collaborators during an event over the network and associated with a discussion item revoker configured not to permit the one or more collaborators to revoke a particular discussion item within a certain time period;
a view controller associated with the one or more collaborators and configured to provide the aggregated discussion items for display on a viewing device with respective voting information and customized to each of the one or more collaborators based upon submissions by each of the one or more collaborators and one or more affiliations of each of the one or more collaborators, wherein the affiliations represent at least one of a group and an organization and the respective display for at least one of the one or more collaborators is different from another and wherein the respective voting information includes presentation on the viewing device of at least one of a voting score and a voting amount indicator;
a voting module configured to receive the voting information submitted by the one or more collaborators for the aggregated discussion items based on a voting configuration, to assign a greater weight to positive voting information than to negative voting information and to assign different weights to the voting information submitted by each of the one or more collaborators based upon the one or more affiliations of each of the one or more collaborators, wherein the voting module is further configured to generate the voting configuration based on the one or more affiliations of the one or more collaborators;
an ordering module configured to analyze the voting information and create an order for the aggregated discussion items based on analyzed voting information, the ordering module further configured to exclude from the aggregated discussion items those aggregated discussion items that do not satisfy a voting information threshold; and
a moderator interface configured to enable a moderator to manage the aggregator, the ordering module, the voting module and the view controller.

2. The system of claim 1, wherein a positive vote has twice as much weight as a negative vote.

3. The system of claim 1, further comprising a comments manager configured to handle comments for the aggregated discussion items.

4. The system of claim 1, further comprising the discussion item revoker configured not to allow the one or more collaborators to revoke and restore the particular discussion item within the certain time period.

5. The system of claim 1, further comprising a discussion storage device configured to store at least one of the voting information, the aggregated discussion items, collaborator profiles and comments.

6. The system of claim 1, wherein the ordering module analyzes the voting information based on analyzing at least one from a group of timestamps, response times, who of the one or more collaborators voted, and who of the one or more collaborators did not vote.

7. The system of claim 1, wherein the aggregator further comprises a timestamper configured to timestamp the aggregated discussion items.

8. The system of claim 1, further comprising a caching module configured to cache at least one of the voting information, the aggregated items, collaborator profiles and comments.

9. A computer-implemented method for distributed discussion collaboration over a network, comprising:
 (a) aggregating a plurality of discussion items submitted by one or more collaborators during an event over the network and not allowing the one or more collaborators to revoke a particular discussion item within a certain time period;
 (b) receiving voting information submitted by the one or more collaborators for aggregated discussion items based on a voting configuration, assigning a greater weight to positive voting information than to negative voting information and assigning different weights to voting information submitted by each of the one or more collaborators based upon one or more affiliations of each of the one or more collaborators, wherein the affiliations represent at least one of a group and an organization and, wherein the voting configuration is generated based on the one or more affiliations of the one or more collaborators;
 (c) creating an order for the aggregated discussion items based upon an analysis of the voting information, wherein the order excludes those aggregated discussion items that do not satisfy a voting information threshold;
 (d) providing for display on a user interface aggregated discussion items in accordance with the order created, with respective voting information during the event including customizing the aggregated discussion items with respective voting information for display for each of the one or more collaborators based upon submissions by each of the one or more collaborators and the one or more affiliations of each of the one or more collaborators, display for at least one of the one or more collaborators being different than for another and wherein the respective voting information presents on the user interface at least one of a voting score and a voting amount indicator; and
 (e) providing a moderator interface configured to enable a moderator to manage the aggregator, the ordering module, the voting module and the view controller.

10. The computer-implemented method of claim 9, wherein a positive vote has twice as much weight as a negative vote.

11. The computer-implemented method of claim 9, further comprising enabling the one or more collaborators to provide at least one of comment on and not to revoke and restore the particular discussion item within a certain time period.

12. The computer-implemented method of claim 9, wherein revoking is based on at least one of the voting information and collaborator comments.

13. The computer-implemented method of claim 9, further comprising enabling the one or more collaborators to submit at least one of the voting information and the at least one discussion item anonymously.

14. The computer-implemented method of claim 9, wherein the analysis of the voting information further comprises analyzing at least one from a group of timestamps, response times, who of the one or more collaborators voted, and who of the one or more collaborators did not vote.

15. The computer-implemented method of claim 9, further comprising merging the voting information with additional voting information from another ongoing event.

16. A system for making an agenda for an event over a network, comprising:
 a computing device;
 an aggregator, implemented on the computing device, and configured to aggregate a plurality of discussion items for the event over the network that are submitted by one or more collaborators prior to the event and associated with a discussion item revoker configured not to permit the one or more collaborators to revoke a particular discussion item within a certain time period;
 a voting module configured to receive voting information submitted by the one or more collaborators for the discussion items based on a voting configuration, to assign a greater weight to positive voting information than to negative voting information and to assign different weights to voting information submitted by each of the one or more collaborators based upon one or more affiliations of each of the one or more collaborators, wherein the affiliations represent at least one of a group and an organization and, wherein the voting module is further configured to generate the voting configuration based on the one or more affiliations of the one or more collaborators;
 an ordering module configured to analyze the voting information and create an order for aggregated discussion items based on analyzed voting information, wherein the ordering module is further configured to exclude those aggregated discussion items that do not satisfy a voting information threshold;
 a view controller associated with the one or more collaborators and configured to provide the aggregated discussion items for display with respective voting information on a user interface and customized to each of the one or more collaborators based upon submissions by each of the one or more collaborators and the one or more affiliations of each of the one or more collaborators prior to the event, wherein the affiliations represent at least one of a group and an organization and display for at least one of the one or more collaborators being different than display to another, the computing device creating the agenda for the event based upon the aggregated discussion items and wherein the respective voting information includes presentation of at least one of a voting score and a voting amount indicator on the user interface; and
 a moderator interface configured to enable a moderator to manage the aggregator, the ordering module, the voting module and the view controller.

17. The system of claim 16, wherein a positive vote has twice as much weight as a negative vote.

18. The system of claim 16, further comprising the discussion item revoker configured not to allow the one or more collaborators to revoke and to restore the particular discussion item within the certain period of time.

19. A computer-implemented method for making an agenda for an event over a network, comprising:
 (a) aggregating a plurality of discussion items submitted by one or more collaborators of an event prior to the event and not allowing the one or more collaborators to revoke a particular discussion item within a certain time period;
 (b) receiving voting information submitted by the one or more collaborators for aggregated discussion items based on a voting configuration, assigning a greater weight to positive voting information than to negative voting information and assigning different weights to voting information submitted by each of the one or more collaborators based upon one or more affiliations of each of the one or more collaborators, wherein the one or more affiliations represent at least one of a group and an organization, wherein the voting configuration is generated based on the one or more affiliations of the one or more collaborators;

(c) creating an order for aggregated discussion items based upon an analysis of the voting information, wherein the order created excludes those aggregated items that do not satisfy a voting information threshold;

(d) providing for display on a user interface aggregated discussion items with respective voting information prior to the event including customizing the ordered aggregated discussion items with respective voting information for display for each of the one or more collaborators based upon submissions by each of the one or more collaborators and the one or more affiliations of each of the one or more collaborators, display for at least one of the one or more collaborators being different than for another and wherein the respective voting information includes at least one of a voting score and a voting amount indicator; and (e) making the agenda for the event based upon the aggregated discussion items.

20. The computer-implemented method of claim 19, wherein a positive vote has twice as much weight as a negative vote.

21. The computer-implemented method of claim 19, further comprising enabling the one or more collaborators to provide at least one of comment on and revoke one of the aggregated discussion items.

22. A non-transitory computer storage medium having instructions stored thereon that, when executed by one or more processors, cause the one or more processors to perform operations comprising:

(a) aggregating a plurality of discussion items submitted by one or more collaborators during an event over a network and not allowing the one or more collaborators to revoke a particular discussion item within a certain time period;

(b) receiving voting information submitted by the one or more collaborators for aggregated discussion items based on a voting configuration that assigns a greater weight to positive voting information than to negative voting information and assigns different weights to voting information submitted by each of the one or more collaborators based upon one or more affiliations of each of the one or more collaborators, wherein the one or more affiliations represent at least one of a group and an organization, wherein the voting configuration is generated based on the one or more affiliations of the one or more collaborators;

(c) creating an order for the aggregated discussion items based upon an analysis of the voting information, wherein the order created excludes those aggregated discussion items that do not satisfy a voting information threshold;

(d) displaying on a user interface the aggregated discussion items with respective voting information during an event including customizing the ordered discussion aggregated items with respective voting information for display for each of the one or more collaborators based upon submissions by each of the one or more collaborators and the one or more affiliations of each of the one or more collaborators, display for at least one of the one or more collaborators being different than for another, and wherein the respective voting information includes at least one of a voting score and a voting amount indicator;

providing a moderator interface configured to enable a moderator to manage the aggregating and ordering of the discussion items, the voting configurations and the viewing of the voting information.

23. The non-transitory computer storage medium of claim 22, wherein a positive vote has twice as much weight as a negative vote.

24. The non-transitory computer storage medium of claim 22, wherein the operations further comprise enabling the one or more collaborators to at least one of comment on and not to revoke and restore the particular discussion item.

25. The non-transitory computer storage medium of claim 22, wherein the revoking is based on at least one of the voting information and collaborator comments.

26. The non-transitory computer storage medium of claim 22, the operations further comprising enabling the one or more collaborators to submit at least one of the voting information and at least one discussion item anonymously.

27. The non-transitory computer storage medium of claim 22, wherein the analysis of the voting information further comprises analyzing at least one from a group of timestamps, response times, who of the one or more collaborators voted, and who of the one or more collaborators did not vote.

28. The non-transitory computer storage medium of claim 22, further comprising merging the voting information with additional voting information from another ongoing event over the network.

29. A non-transitory computer storage medium having instructions stored thereon that, when executed by one or more processors, cause the one or more processors to perform operations comprising:

(a) aggregating a plurality of discussion items submitted by one or more collaborators of an event over the network, prior to the event and not allowing the one or more collaborators to revoke a particular discussion item within a certain time period;

(b) receiving voting information submitted by the one or more collaborators for aggregated discussion items based on a voting configuration that assigns a greater weight to positive voting information than to negative voting information and assigns different weights to voting information submitted by each of the one or more collaborators based upon one or more affiliations of each of the one or more collaborators, wherein the one or more affiliations represent at least one of a group and an organization, and wherein the voting configuration is generated based on the one or more affiliations of the one or more collaborators;

(c) ordering the aggregated discussion items based upon an analysis of the voting information, wherein the ordering excludes those aggregated discussion items that do not satisfy a voting information threshold;

(d) displaying on a user interface ordered aggregated discussion items with respective voting information prior to the event including customizing the ordered aggregated discussion items with respective voting information for display for each of the one or more collaborators based upon submissions by each of the one or more collaborators and the one or more affiliations of each of the one or more collaborators, display for at least one of the one or more collaborators being different than for another, and wherein the respective voting information displayed on the user interface includes at least one of a voting score and a voting amount indicator; and (e) making the agenda for the event based upon the aggregated discussion items for viewing by the one or more collaborators.

30. The non-transitory computer storage medium of claim 29, wherein a positive vote has twice as much weight as a negative vote.

31. The non-transitory computer storage medium of claim 29, the operations further comprising enabling the one or more collaborators to at least one of comment on and not to revoke and restore the particular discussion item within the certain time period.

* * * * *